(12) United States Patent
Kanai

(10) Patent No.: US 6,229,653 B1
(45) Date of Patent: May 8, 2001

(54) VARIABLE-POWER EYEPIECE OPTICAL SYSTEM

(75) Inventor: Moriyasu Kanai, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/459,632

(22) Filed: Dec. 13, 1999

(30) Foreign Application Priority Data

Nov. 6, 1998 (JP) .................................................. 10-357881

(51) Int. Cl.⁷ ............................. G02B 25/00; G02B 15/14
(52) U.S. Cl. ........................... 359/643; 359/686; 359/689
(58) Field of Search .................................... 359/643–644, 359/676, 680–683, 686–687, 689, 422–424, 432

(56) References Cited

U.S. PATENT DOCUMENTS

| | | | |
|---|---|---|---|
| 5,311,355 | 5/1994 | Kato | 359/432 |
| 5,504,624 | 4/1996 | Kato | 359/687 |
| 5,576,888 | * 11/1996 | Betensky | 359/676 |
| 5,576,892 | 11/1996 | Hotta et al. | 359/696 |
| 5,663,834 | * 9/1997 | Koizumi | 359/643 |
| 5,734,509 | 3/1998 | Ueno | 359/689 |

FOREIGN PATENT DOCUMENTS

| | | |
|---|---|---|
| 62-134617 | 6/1987 | (JP) . |
| 4-204616 | 7/1992 | (JP) . |
| 5-5840 | * 1/1993 | (JP) . |
| 6-175048 | 6/1994 | (JP) . |

OTHER PUBLICATIONS

An English Language abstract of JP 62–134617, Jun. 17, 1987.
An English Language abstract of JP 4–204616, Jul. 27, 1992.
An English Language abstract of JP 6–175048, Jun. 24, 1994.

* cited by examiner

Primary Examiner—Georgia Epps
Assistant Examiner—Jordan M. Schwartz
(74) Attorney, Agent, or Firm—Greenblum & Bernstein, P.L.C.

(57) ABSTRACT

A variable-power eyepiece optical system, which is used in combination with an objective optical system, includes a negative first lens group, a second lens group having a positive first sub lens group and a positive second sub lens group, and a positive third lens group, in this order from the objective optical system. The first lens group, and the first and second sub lens groups of the second lens group are made moveable along the optical axis upon variable power, while the third lens group is made immoveable. At the time of variable power, the first sub lens group and the second sub lens group move independently of each other in a direction opposite to the direction along which the first lens group moves, and thereby the resultant power of the first and second sub lens groups is varied.

3 Claims, 22 Drawing Sheets

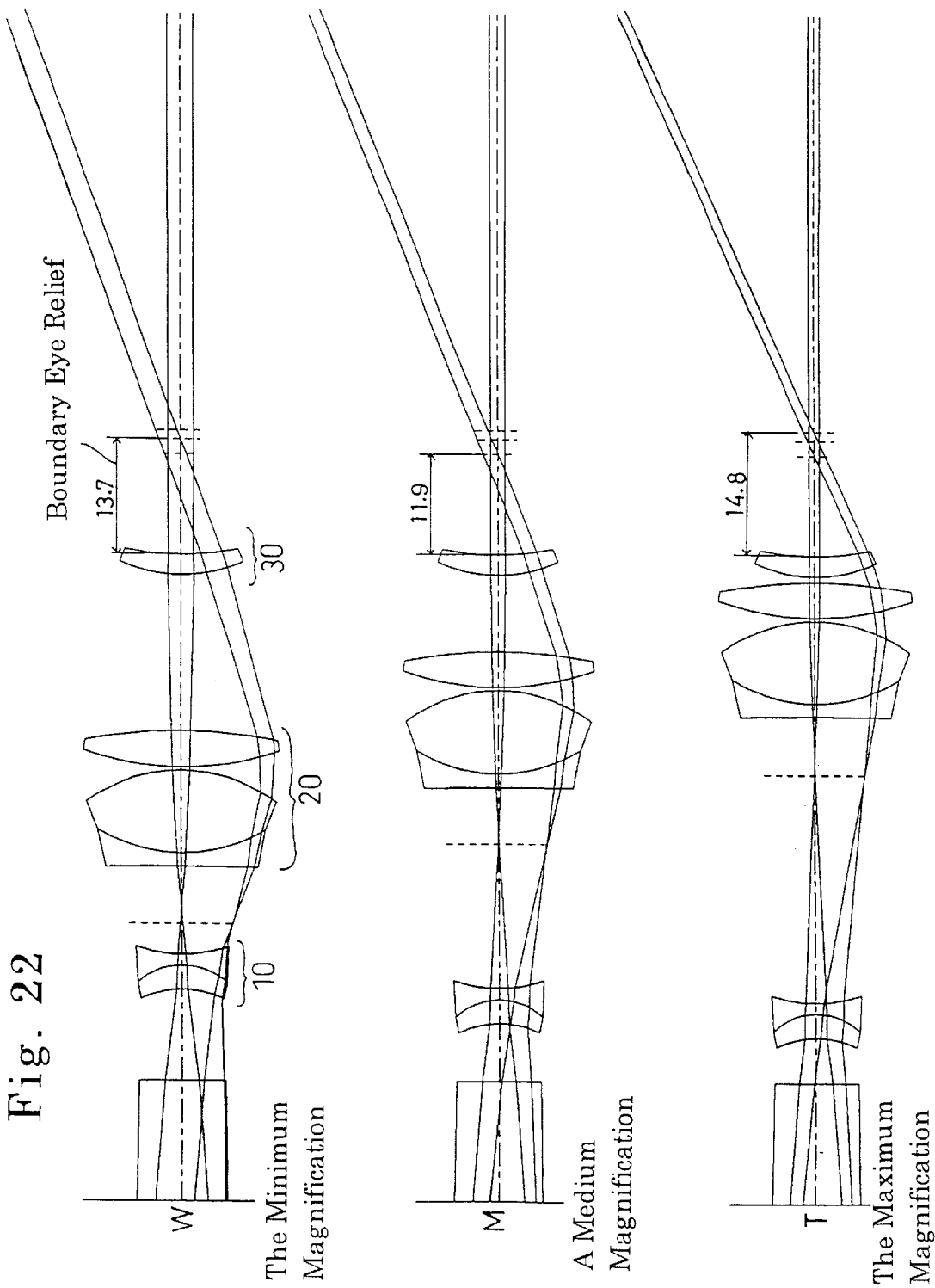

VARIABLE-POWER EYEPIECE OPTICAL SYSTEM

BACKGROUND OF THE INVENTION

1. Field of the Invention

The present invention relates to a variable-power eyepiece optical system which is used in combination with an objective optical system of binoculars, telescopes or microscopes.

2. Description of the Related Art

Various types of variable-power eyepiece optical systems having a magnification ratio of about 2 have conventionally been proposed. For example, Japanese Unexamined Patent Publication No. Hei-4-204616 has disclosed an afocal variable-power optical system including an objective optical system, an erecting optical system and a variable-power eyepiece optical system. Further, Japanese Unexamined Patent Publications Nos.Sho-62-134617 and Hei-6-175048 have solely disclosed variable-power eyepiece optical systems, i.e., the variable-power eyepiece optical systems have been disclosed without being accompanied by an objective optical system and an erecting optical system. With respect to each of the above publications, the variable-power eyepiece optical system is formed as a three-lens-group variable-power eyepiece optical system including a negative first moveable lens group, a field diaphragm, a positive second moveable lens group and a positive third immoveable lens group, in this order from the object. According to this arrangement, upon variable-power the first and second moveable lens groups are moved in the opposing directions, and at the same time, the change in diopter is corrected; however, the change in the exit pupil distance (i.e., the eye relief: the distance between the most viewer's eye-side surface and the eye point) cannot be corrected. In particular, if an attempt is made to obtain a higher magnification ratio of more than 2, the change in the exit pupil distance becomes extremely large, so that variable-power causes an eclipse.

SUMMARY OF THE INVENTION

It is an object of the present invention to provide a variable-power eyepiece optical system which can attain a magnification ratio of more than 2, can have a variable power function with a minimum positional change in the eye relief, and can prevent an eclipse.

The present invention is applied to a variable-power eyepiece optical system including a negative first moveable lens group, a positive second moveable lens group and a positive third immoveable lens group, in this order from an objective optical system. A conception of the present invention is to divide the positive second lens group into at least two moveable sub lens groups so that by independently moving these sub lens groups, the resultant power of the second lens group is varied, and thereby the object-image distance of the pupils (the distance between the entrance pupil and the exit pupil) is varied, and the position of the exit pupil is moved. Consequently, the change in the eye relief upon variable power is reduced, and an eclipse due to variable power is prevented.

In order to achieve the above mentioned object, there is provided a variable-power eyepiece optical system, which is used in combination with an objective optical system, including a negative first lens group, a second lens group having a positive first sub lens group and a positive second sub lens group, and a positive third lens group, in this order from the objective optical system. The first lens group, and the first and second sub lens groups of the second lens group are made moveable along the optical axis upon variable power, while the third lens group is made immoveable. More concretely, at the time of variable power, the first sub lens group and the second sub lens group move independently of each other in a direction opposite to the direction along which the first lens group moves, and thereby the resultant power of the first and second sub lens groups is varied.

In order to vary the resultant power of the second lens group suitably upon variable power, the variable-power eyepiece optical system according to the present invention preferably satisfies the following condition:

$$0.7 < f2a/f2b < 1.4 \qquad (1)$$

wherein $f2a$ designates the focal length of the positive first sub lens group; and $f2b$ designates the focal length of the positive second sub lens group.

In order to obtain a longer eye relief along the overall variable-power range, the positive first sub lens group preferably includes a cemented sub lens group having a negative lens element and a positive lens element, and the positive second sub lens group and the positive third lens group preferably include a single lens element respectively. In the above cemented lens elements, the order of the negative and positive lens elements is not required.

The present disclosure relates to subject matter contained in Japanese Patent Application No.Hei-10-357881 (filed on Dec. 16, 1998) which is expressly incorporated herein by reference in its entirety.

BRIEF DESCRIPTION OF THE DRAWINGS

The invention will be discussed below in detail with reference to the accompanying drawings, in which:

FIG. 22 shows the upper and lower light rays of an axial bundle of rays, and the upper and lower light rays of a marginal bundle of rays, which are generated by the three-lens-group variable-power eyepiece optical system of FIG. 21.

DESCRIPTION OF THE PREFERRED EMBODIMENTS

Figure 20:
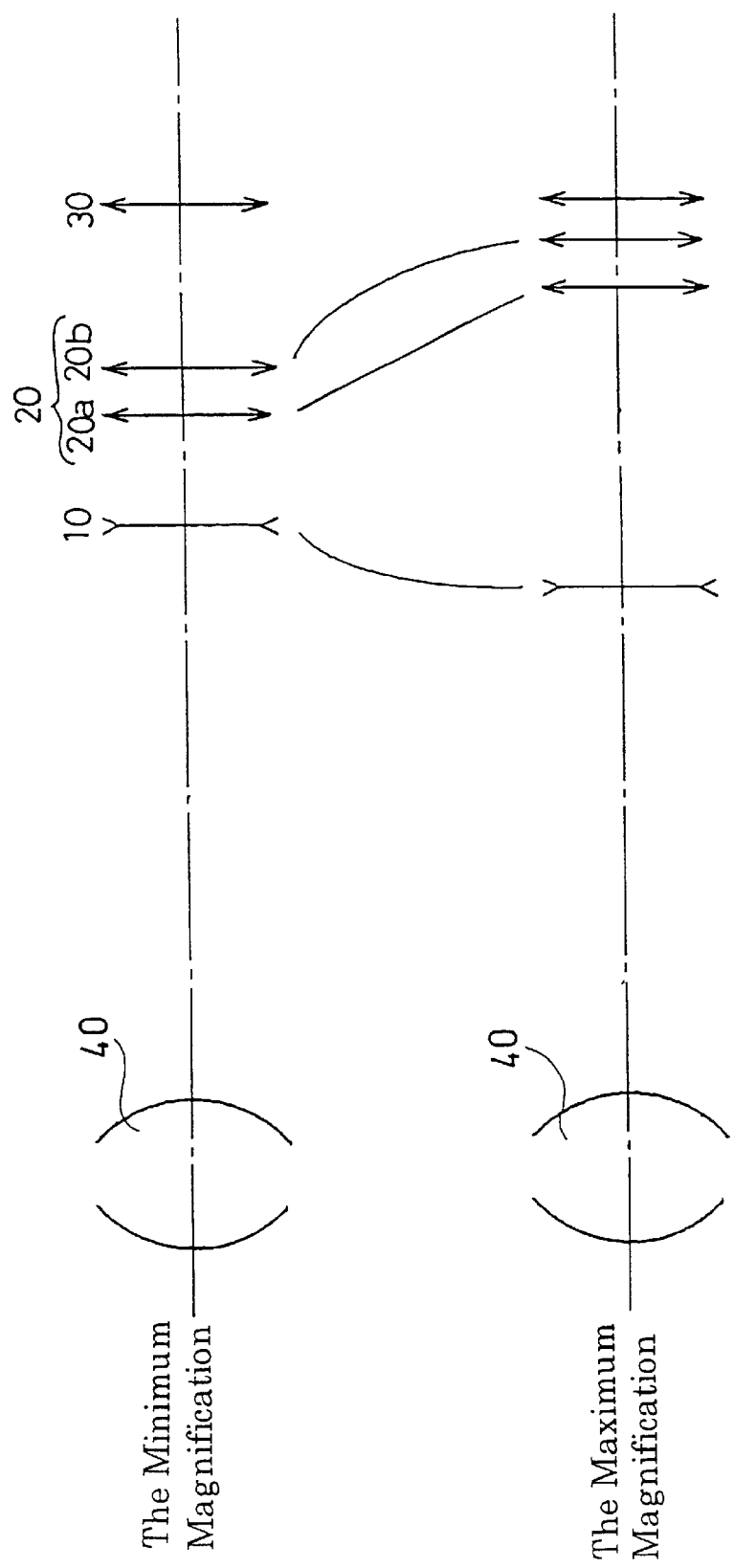
FIG. 20 shows the lens-group moving paths of a variable-power eyepiece optical system according to the present invention.

A variable-power eyepiece optical system of the present invention, as shown in FIG. 20, is used in combination with an objective optical system 40, and includes a negative first lens group 10, a positive second lens group 20 having a positive first sub lens group 20a and a positive second sub lens group 20b, and a positive third lens group 30, in this order from the objective optical system 40 (an object). The first lens group 10, and the first sub lens group 20a and the second sub lens groups 20b are made moveable, and the third lens group 30 is made immoveable. Upon variable power, the first sub lens group 20a and the second sub lens groups 20b move independently of each other in a direction opposite to the direction along which the first lens group 10 moves.

As mentioned above, according to the variable-power eyepiece optical system of the present invention, in the 'negative, positive and positive' three-lens-group arrangement in this order from the objective optical system, the positive second lens group is divided into two moveable sub lens groups so that by independently moving these sub lens groups, the resultant power of the second lens group is varied, and thereby the object-image distance of the pupils is varied, and the position of the exit pupil is moved. Consequently, the change in the eye relief upon variable power is reduced, and thereby an eclipse due to variable power is prevented. In this specification, the object-image distance of the pupils denotes the distance between the entrance pupil and the exit pupil; and an image forming magnification of the pupils denotes an image forming magnification in the case where the entrance pupil and the exit pupil are assumed to be positioned at the object point and the image point respectively.

Here, an illustrative example of a three-lens-group variable-power eyepiece optical system will be discussed. In such an eyepiece optical system for enlarging and viewing an object, the entrance pupil is considered to be positioned in the vicinity of the objective optical system. In order to place the image-forming position of the objective optical system in the vicinity of the viewer's eye-side of the first lens group of the eyepiece optical system, the objective optical system is positioned sufficiently distant from the first lens group toward the object so that the distance between the objective optical system and the first lens group is longer than the focal length of the first lens group. Consequently, at a low magnification, the exit pupil of the first lens group is formed in the vicinity of the object-side focal point of the first lens group. The exit pupil is transmitted to the third lens group through the second lens group, and further the third lens group having a weak power transmits the exit pupil toward the viewer's eyes. The image forming magnification of the pupils with respect to the second lens group is substantially one, and the image forming magnification of the pupils with respect to the third lens group is slightly lower than one. When the view's eye is positioned in the vicinity of the exit pupil of the third lens group, an enlarged image of the object can be viewed.

Figure 21:
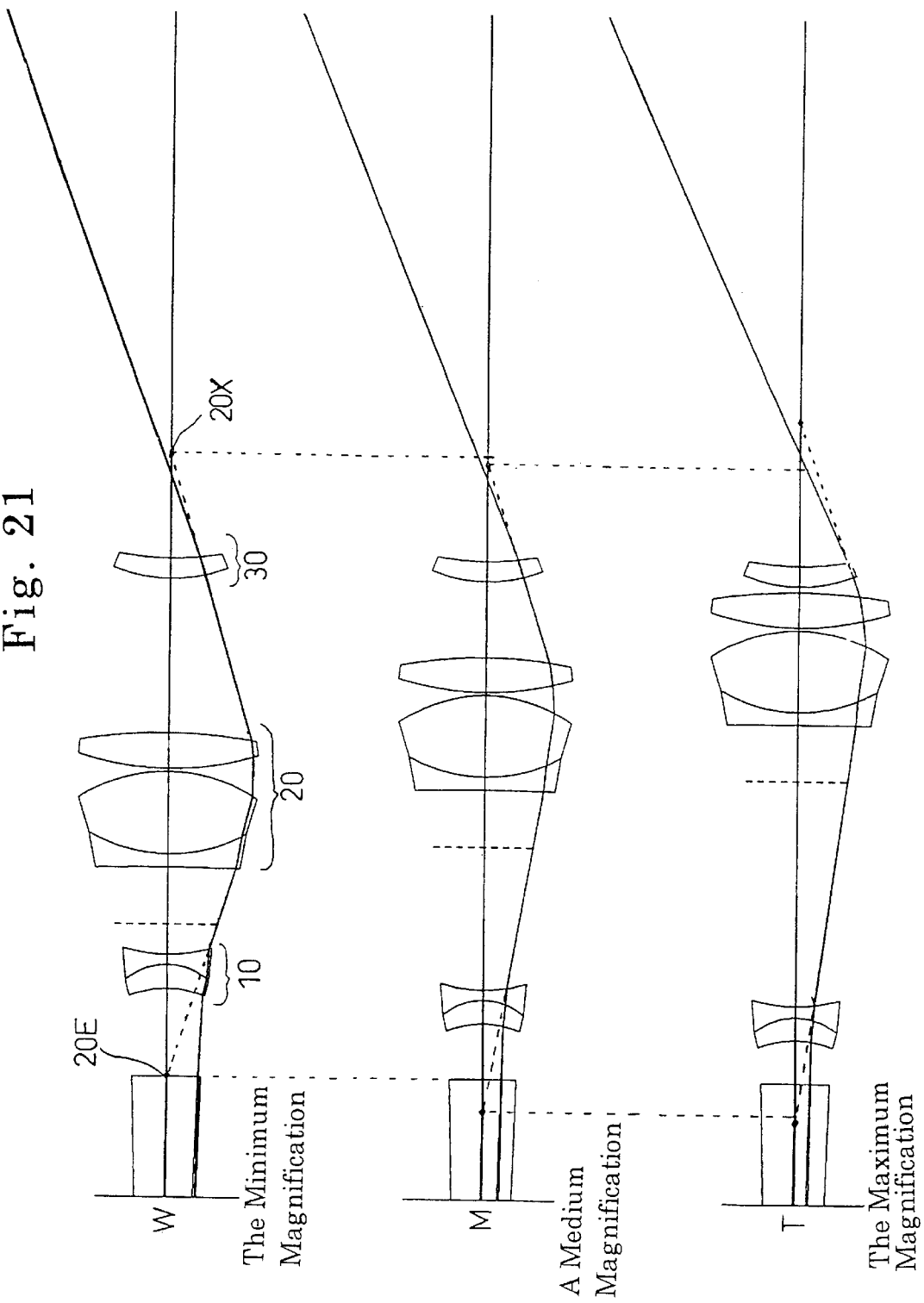
FIG. 21 shows a lens arrangement of a three-lens-group variable-power eyepiece optical system as an illustrative example, and shows the principal rays of the most marginal bundle of rays.

FIG. 21 shows the principal rays of the most marginal bundle of rays respectively at the minimum magnification W, a medium magnification M and the maximum magnification T, in a 'negative-positive-positive' three-lens-group variable-power eyepiece optical system, as an illustrative example, in which the entrance pupil thereof is positioned on the most object-side surface of the objective optical system. Upon variable power from the low magnification W toward the high magnification T, the first lens group 10 moves toward the object. Since the entrance pupil (i.e., the objective optical system) is sufficiently distant from the first lens group 10 toward the object to the extent that the distance between the objective optical system and the first lens group is longer than the focal length of the first lens group, the exit pupil of the first lens group 10 (i.e., the entrance pupil 20E of the second lens group 20) is formed in the vicinity of the object-side focal point of the first lens group 10, and the position of the exit pupil with respect to the first lens group 10 is almost unchanged. However, as explained, since the first lens group 10 itself moves toward the object, the exit pupil also moves toward the object by a distance equivalent to the traveling distance of the first lens group 10. At the same time, due to the movement of the first lens group 10 toward the object, the primary image forming position is largely moved toward the viewer's eye, and thereby the diopter is varied. Therefore in order to maintain the diopter constant, the second lens group 20 moves by a longer distance toward the viewer's eye. Consequently, at a high magnification, the exit pupil of the second lens group 20 moves toward the viewer's eye. Since the image forming magnification of the pupils is reduced while the object-image distance of the pupils increases, even if the entrance pupil of the second lens group 20 moves, as explained, toward the object by a distance equivalent to the traveling distance of the first lens group 10, the exit pupil 20X of the second lens group 20 moves toward the viewer's eye. Further, since the third lens group 30 is made immoveable, the exit pupil of the third lens group 30 moves toward the viewer's eye in accordance with the movement of the exit pupil 20X of the second lens group 20.

A three-lens-group variable-power eyepiece optical system of the above type generally has the following characteristics:

(1) The width of the marginal bundle of rays at a lower magnification is greater than, or equal to, the width of the marginal bundle of rays at a high magnification;

(2) The apparent field of view at a lower magnification is less than the apparent field of view at a higher magnification; ;and (3) Distortion (spherical aberration of the pupil) at a lower magnification is less than distortion (spherical aberration of the pupil) at a higher magnification.

When the above characteristics are considered, it is understood that under the same eye relief, an eclipse is less frequently occurred at a lower magnification than at a higher magnification, though the characteristic (3) can be largely improved by an aspherical surface. Here, the eye relief denotes the distance from the final lens surface to the exit pupil of the final lens group. If the distance between the final lens surface and the intersecting point of the most peripheral light ray of the most marginal bundle of rays and the optical axis is defined as a boundary eye relief, the boundary eye relief at a lower magnification is greater than the boundary eye relief at a higher magnification. Then, if the following condition is provided as the fourth characteristic, at least the boundary eye reliefs at the minimum and maximum magnification can be substantially made equal, and hence, an eclipse can be eliminated:

(4) The eye relief at the minimum magnification is less than the eye relief at the maximum magnification.

On the other hand, if the magnification ratio becomes larger, the eye relief at a medium magnification causes a problem to be considered. The image forming magnification of the pupils of the second lens group 20 is made smaller at a medium magnification than at the minimum magnification, so that the object-image distance of the pupils increases. However, the exit pupil of the second lens group cannot be moved sufficiently toward the viewer's eye with respect to the entrance pupil thereof which can be moved toward the object by a distance equivalent to the traveling distance of the first lens group 10. Accordingly, the exit pupil of the third lens group 30 as well cannot be moved toward the viewer's eye sufficiently. In connection with FIG. 21, FIG. 22 shows the upper and lower light rays of an axial bundle of rays, and the upper and lower light rays of a marginal bundle of rays respectively at the minimum, a medium and the maximum magnification. In regard to the boundary eye relief in these examples, the difference between the maximum magnification and the minimum magnification is 1.1 mm; however the difference between the maximum magnification and the medium magnification is 2.9 mm. It is understood that an eclipse tends to occur at the medium magnification.

According to the present invention, the positive second lens group 20 is divided into the positive sub lens group 20a and the positive sub lens group 20b, and upon variable power, these sub lens groups move independently of each other in a direction opposite to the direction along which the first lens group 10 moves, and thereby the resultant power of the second lens group 20 varied. Consequently the object-image distance of the pupils is varied, and the exit pupil of the second lens group 20 is moved, and thereby the change in the eye relief upon variable power is reduced. In the case where the resultant power of the second lens group 20 is assumed to be fixed, the following operations can be considered:

(a) if the boundary eye relief becomes shorter, the resultant power is made weaker, so that the object-image distance of the pupils of the second lens group 20 is varied to be longer; on the other hand, (b) if the boundary eye relief becomes longer, the resultant power is made stronger, so that the object-image distance of the pupils of the second lens group 20 is varied to be shorter.

Figure 19:
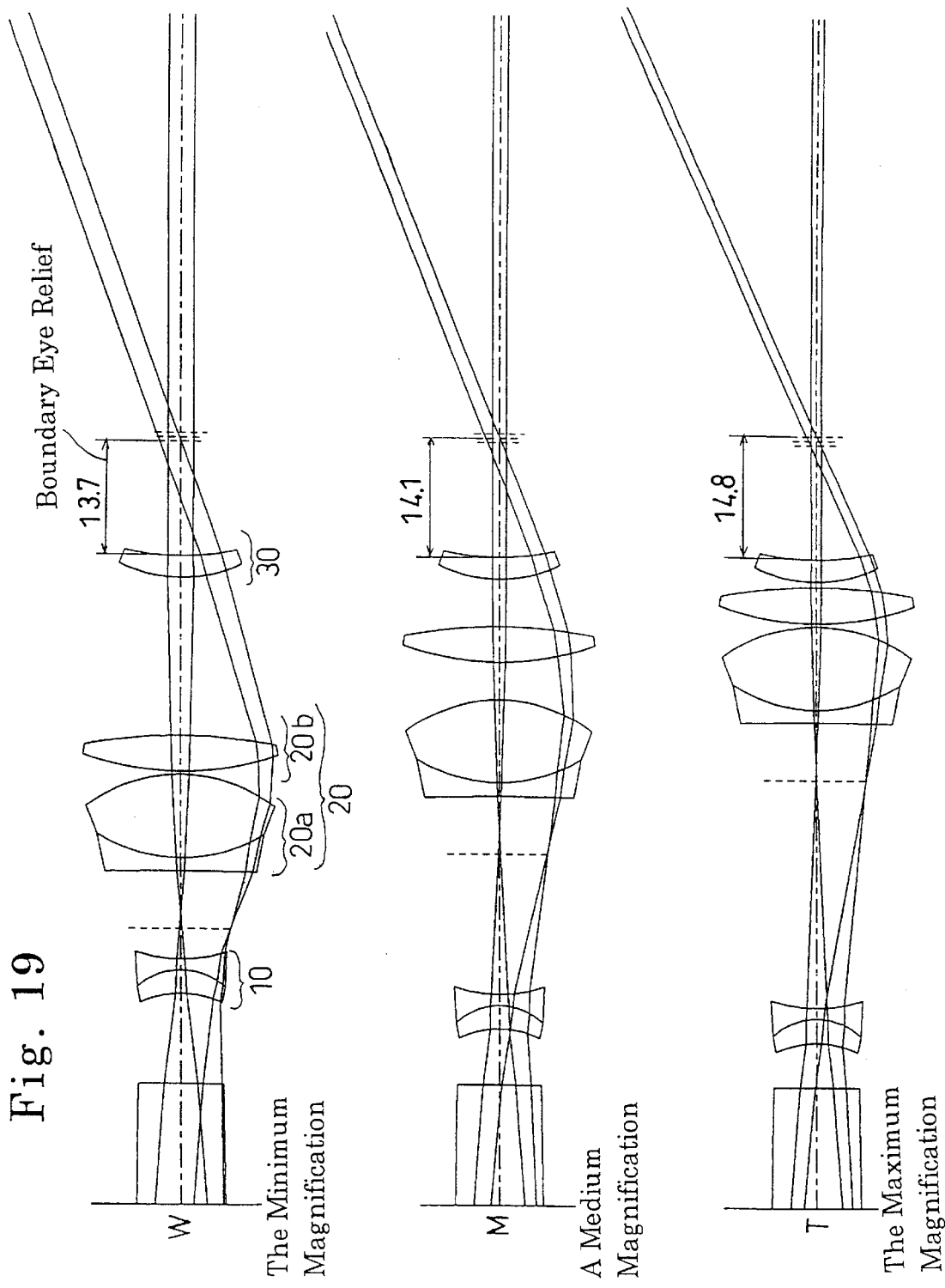
FIG. 19 shows the upper and lower light rays of an axial bundle of rays, and the upper and lower light rays of a marginal bundle of rays, which are generated by the three-lens-group variable-power eyepiece optical system according to the present invention.

Through these operations, the positional change in the entrance pupil of the second lens group 20 upon variable power is corrected, and the change in the boundary eye relief is reduced. In this regard, FIG. 19, corresponding to FIG. 22, shows the upper and lower light rays of an axial bundle of rays, and the upper and lower light rays of a marginal bundle of rays, which are generated by the three-lens-group variable-power eyepiece optical system according to the embodiments of the present invention, and the boundary eye reliefs are indicated therein. It is understood that the difference of the boundary eye reliefs between the maximum magnification and the medium magnification is 0.7 mm, which is made smaller than the corresponding difference in FIG. 22. Furthermore, an eclipse does not occur at the medium magnification.

Condition (1) is for suitably varying the resultant power of the second lens group 20 upon variable power. If one of the sub lens groups 20a and 20b has too strong power and the other has too weak power, the resultant power cannot be varied sufficiently upon variable power. If f2a/f2b exceeds the lower limit of condition (1), the power of the second sub lens group 20b becomes too weak, and if f2a/f2b exceeds the upper limit of condition (1), the power of the first sub lens group 20a becomes too weak. In both cases, the change in the boundary eye relief upon variable power is cannot be reduced sufficiently.

If an attempt is made to have a longer boundary eye relief, the first sub lens group 20a which is positioned in the vicinity of the primary image forming plane preferably includes a cemented sub lens group having a negative lens element and a positive lens element, between which the cemented surface having strong divergent power is formed, and thereby the height of a marginal bundle of rays is increased. Furthermore, if the first sub lens group 20a includes such a cemented sub lens group as explained above, chromatic aberration as well can be corrected. Still further, if the second sub lens group 20b and the third lens group 30 respectively include a single lens element, the eye relief can be made longer by maintaining the position of the marginal bundle of rays, as high as possible, from the optical axis while the distance between the principal points can be made shorter, and a space for moving the lens groups upon variable power can be secured sufficiently.

Specific numeral data of the embodiments will be described hereinafter. In the diagrams of chromatic aberration represented by spherical aberration (axial chromatic aberration), the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables of the following embodiments, W designates the real field of view (the half angle-of-view)(°), $f_o$ designates the focal length of the objective optical system, $f_e$ designates the focal length of the variable-power eyepiece optical system, R designates the radius of curvature of each lens surface, D designates the lens thickness or the distance between the lens elements, $N_d$ designates the refractive index at the d-line, and v designates the Abbe number.

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10}\ldots;$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient;

In the following three embodiments, the variable-power eyepiece optical system is assumed to be used in binoculars. In a drawing for each embodiment, the objective optical system and a developed view of an image-erecting prism which are common in the three embodiments are depicted in front of the variable-power eyepiece optical system. The objective optical system is not limited to a particular optical instrument, and therefore the objective optical system for an astronomical telescope or for a microscope can be used. Further, in the case where an optical system can dispense with an erected image, there is no need to provide an image-erecting prism.

Embodiment 1

Figure 1:
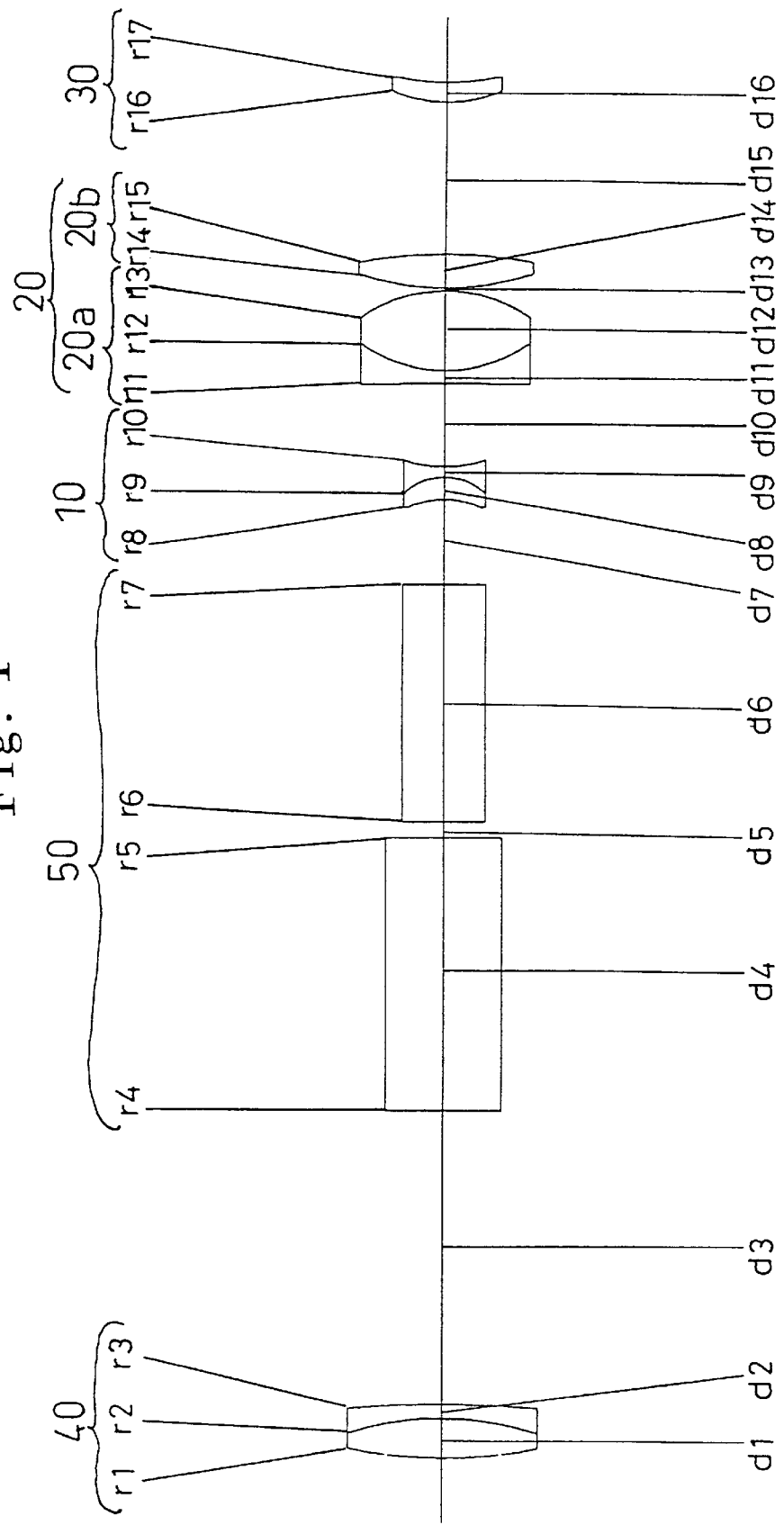
FIG. 1 is a lens arrangement of a first embodiment of a variable-power eyepiece optical system, according to the present invention, at the minimum magnification; and in the lens arrangement of FIG. 1, an objective optical system and an erecting optical system are also shown.
Figure 2:
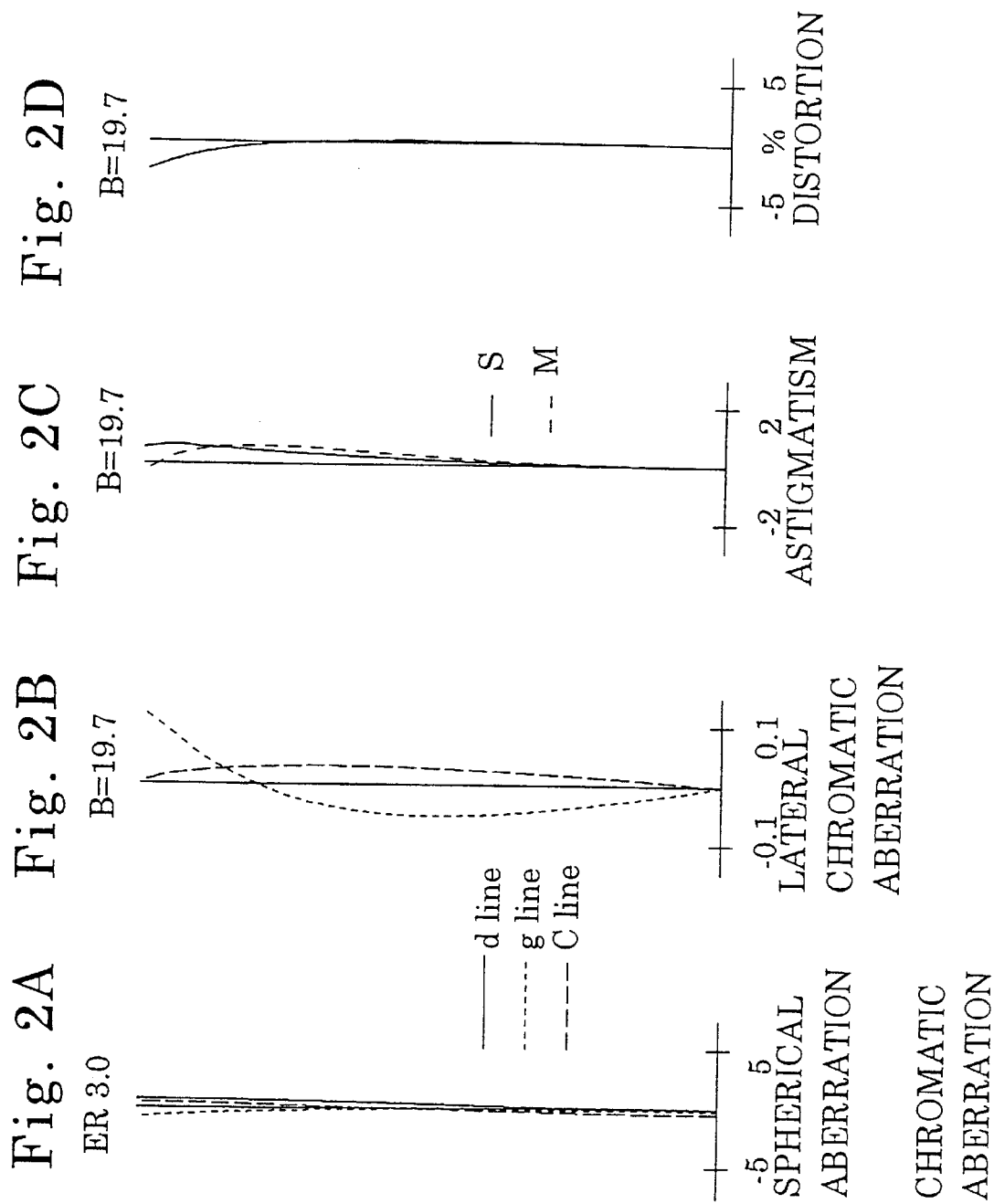
FIGS. 2A, 2B, 2C and 2D are aberration diagrams of the lens arrangement shown in FIG. 1.
Figure 3:
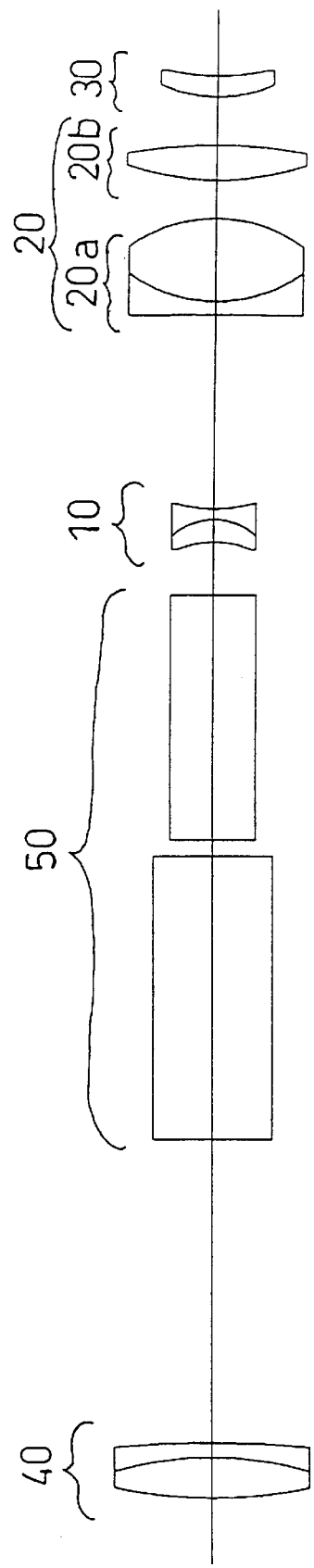
FIG. 3 is the lens arrangement of the first embodiment at a medium magnification.
Figure 4:
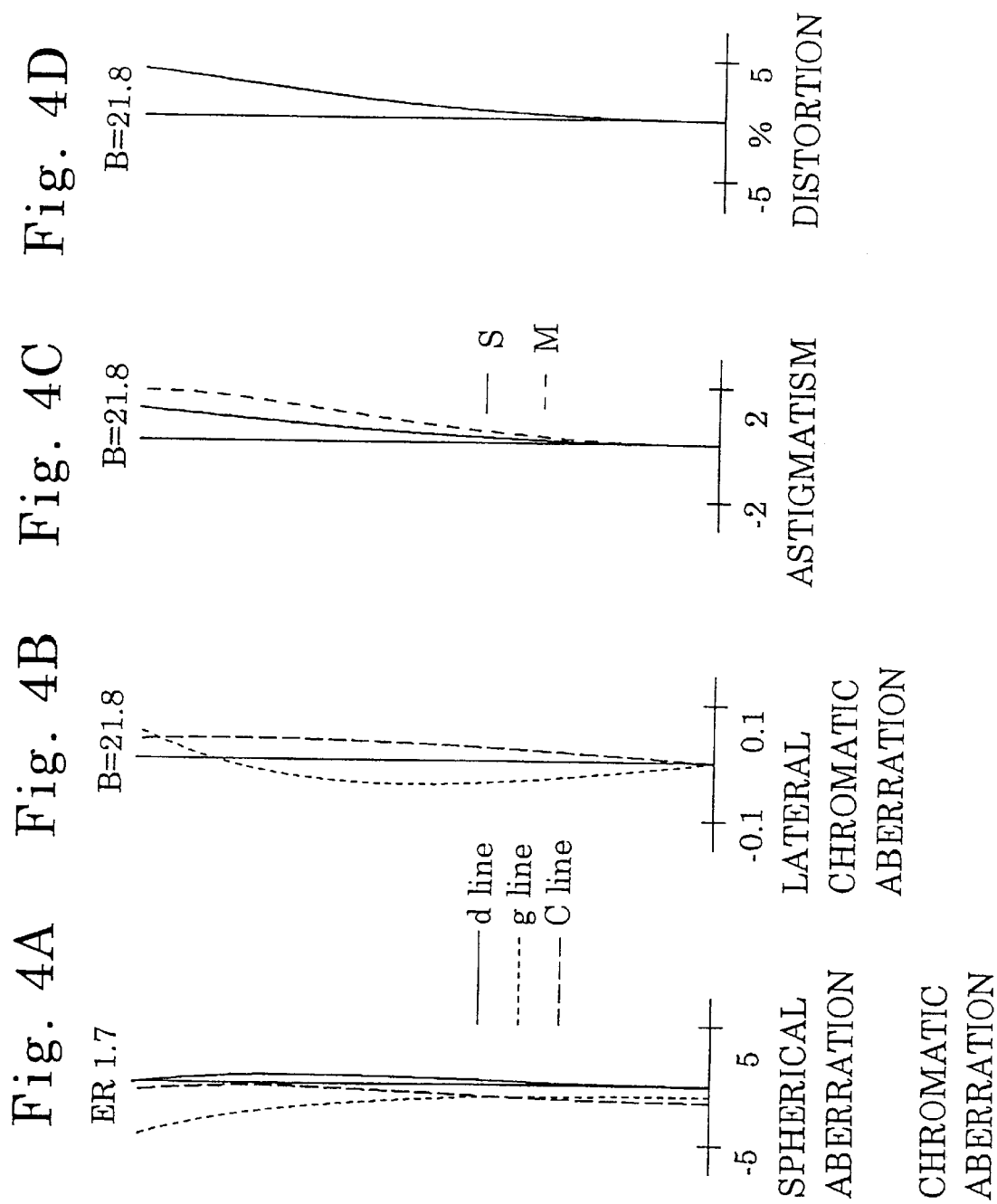
FIGS. 4A, 4B, 4C and 4D are aberration diagrams of the lens arrangement shown in FIG. 3.
Figure 5:
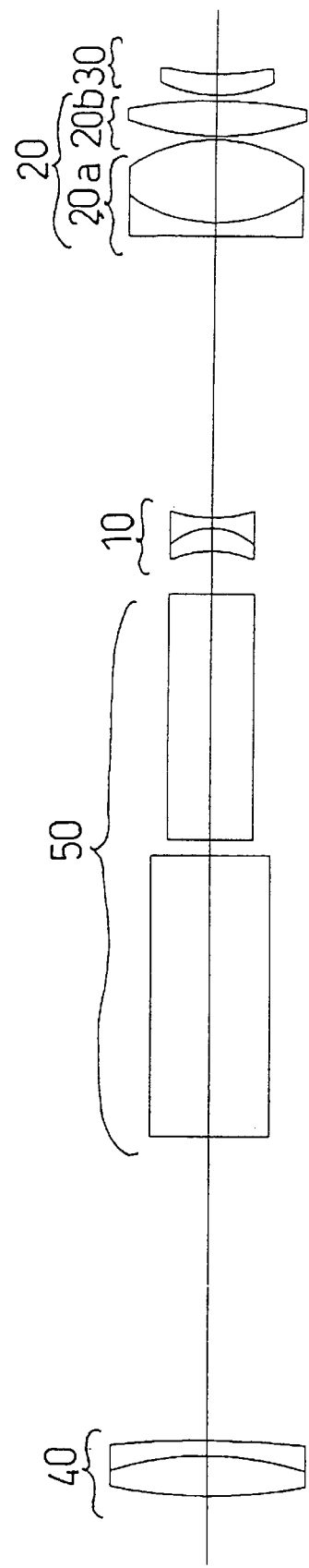
FIG. 5 is the lens arrangement of the first embodiment at the maximum magnification.
Figure 6:
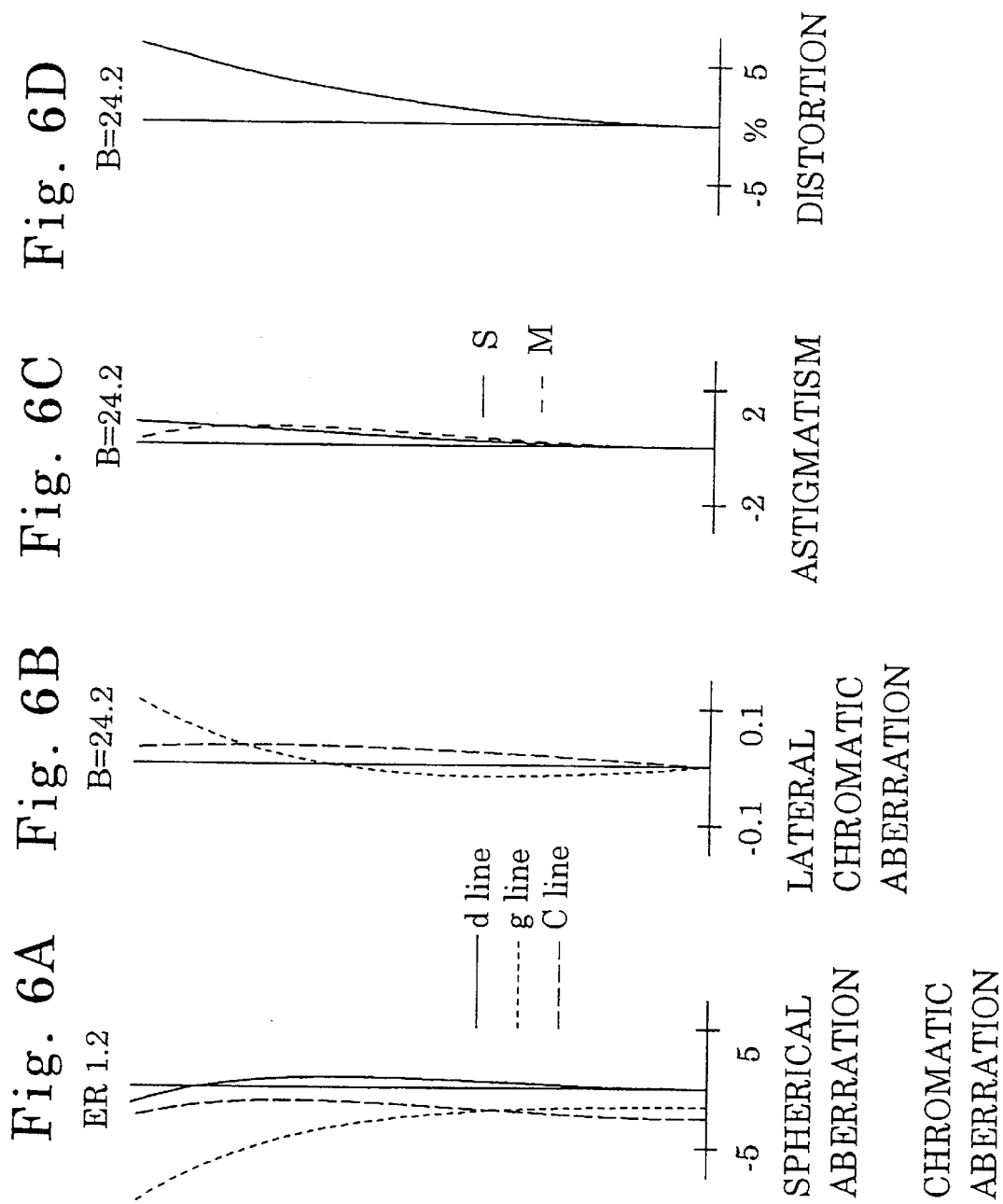
FIGS. 6A, 6B, 6C and 6D are aberration diagrams of the lens arrangement shown in FIG. 5.

FIGS. 1, 3 and 5 show the lens arrangements of the variable-power eyepiece optical system respectively at the minimum magnification, at a medium magnification and at the maximum magnification. FIGS. 2A through 2D, FIGS. 4A through 4D and FIGS. 6A through 6D are the aberration diagrams for the lens arrangements respectively shown in FIGS. 1 3 and 5. Table 1 shows the lens data thereof. Surface Nos. 1 through 3 designates the objective optical system 40, and surface Nos. 4 through 7 designates the image-erecting optical system 50. Surfaces Nos. 8 through 17 designates the eyepiece optical system. Surface Nos. 8 through 10 designate the positive first lens group 10, surface Nos. 11 through 13 designate the positive first sub lens group 20*a*, surface Nos. 14 through 15 designate the positive second sub lens group 20*b*, and surface Nos, 16 through 17 designate a positive third lens group 30. The objective optical system 40 includes a cemented sub lens group having a positive lens element and a negative lens element, in this order from the object. The image-erecting optical system 50 includes two triangular prisms (right-angle prisms) having two reflection surfaces. The first lens group 10 includes a cemented sub lens group having a positive lens element and a negative lens element, in this order from the object. The first sub lens group 20*a* includes a cemented sub lens group having a negative lens element and a positive lens element, the second sub lens group 20*b* includes a positive single lens element, and the third lens group 30 includes a positive single lens element. Upon variable power from the minimum magnification toward the maximum magnification, the first lens group 10 moves toward the object, and the first and second sub lens groups 20*a*, 20*b* independently move toward the image.

Table 1

W=2.6–1.6–1.2

$f_o$=98.391

$f_e$=12.258–7.018–5.021 (Variable-Power: 2.44)

| Surface No. | R | D | Nd | ν |
|---|---|---|---|---|
| 1 | 59.200 | 4.800 | 1.51633 | 64.1 |
| 2 | −43.195 | 1.800 | 1.62004 | 36.3 |
| 3 | −158.490 | 36.170 | — | — |
| 4 | ∞ | 34.000 | 1.56883 | 56.3 |
| 5 | ∞ | 2.000 | — | — |
| 6 | ∞ | 30.000 | 1.56883 | 56.3 |
| 7 | ∞ | 10.660–6.550–5.238 | — | — |
| 8 | −11.336 | 2.800 | 1.84666 | 23.8 |
| 9 | −7.600 | 1.300 | 1.51633 | 64.1 |
| 10 | 17.179 | 10.510–23.746–34.112 | — | — |
| 11 | −430.160 | 1.600 | 1.84666 | 23.8 |
| 12 | 18.768 | 9.900 | 1.69680 | 55.5 |
| 13 | −18.768 | 0.400–4.506–0.400 | — | — |
| 14 | 34.700 | 4.260 | 1.60311 | 60.7 |
| 15 | −60.500 | 18.870–5.638–0.690 | — | — |
| 16 | 17.494 | 2.500 | 1.51633 | 64.1 |
| 17 | 31.300 | — | — | — |

Embodiment 2

Figure 7:
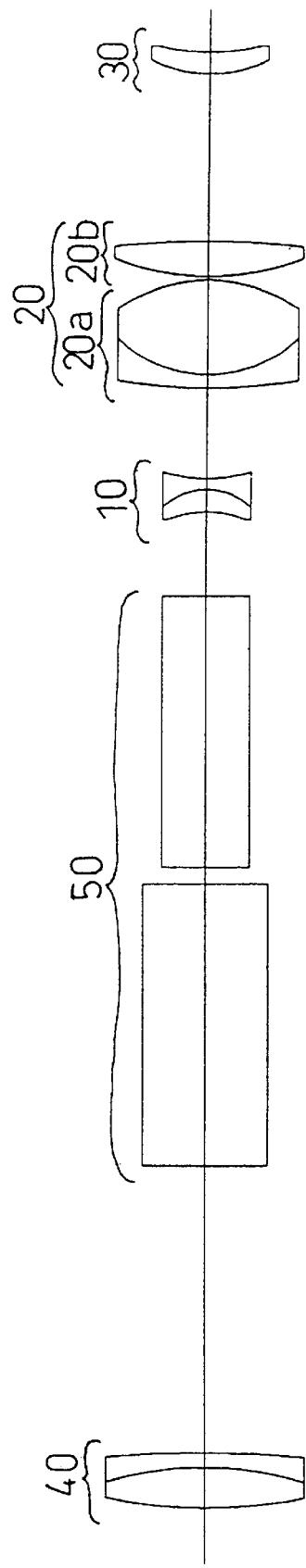
FIG. 7 is a lens arrangement of a second embodiment of a variable-power eyepiece optical system, according to the present invention, at the minimum magnification; and in the lens arrangement of FIG. 7, an objective optical system and an erecting optical system are also shown.
Figure 8:
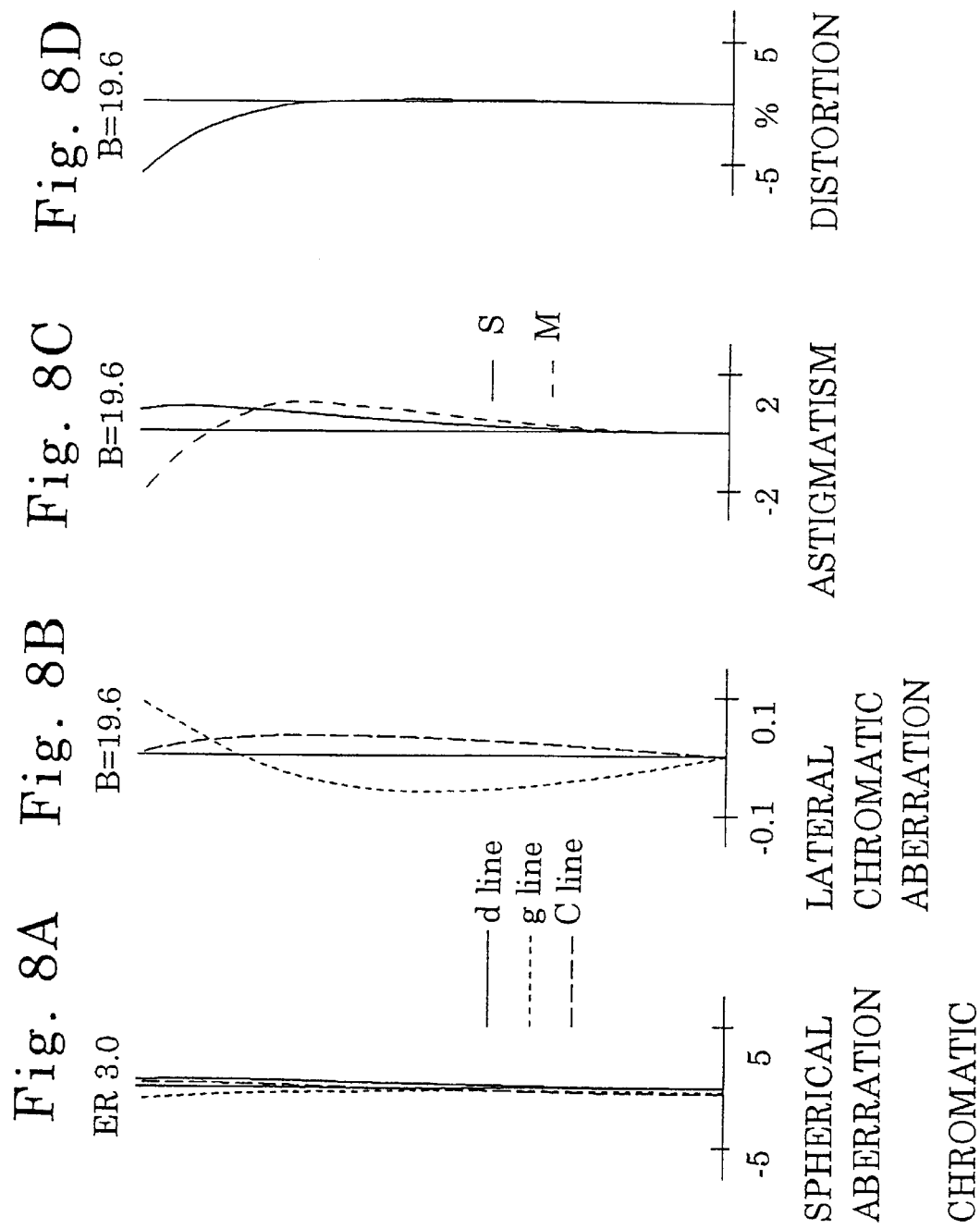
FIGS. 8A, 8B, 8C and 8D are aberration diagrams of the lens arrangement shown in FIG. 7.
Figure 9:
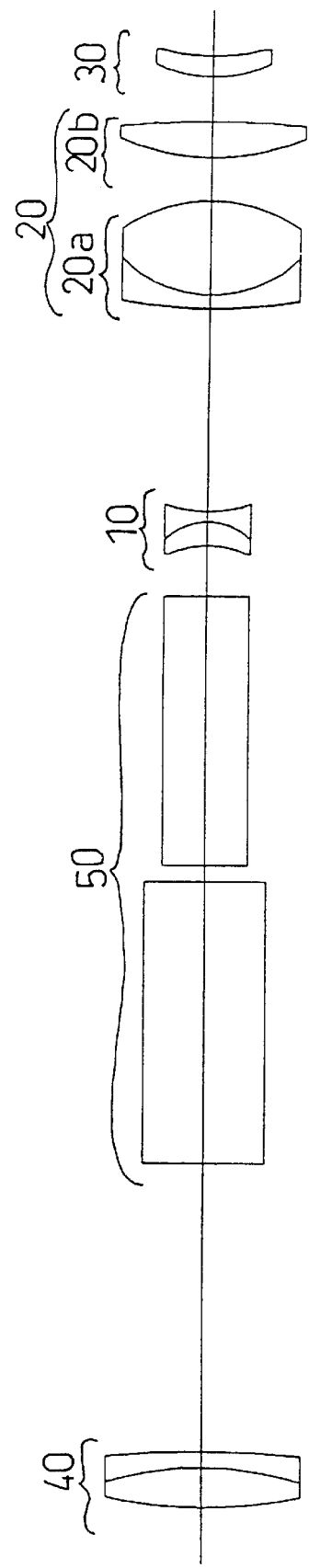
FIG. 9 is the lens arrangement of the second embodiment at a medium magnification.
Figure 10:
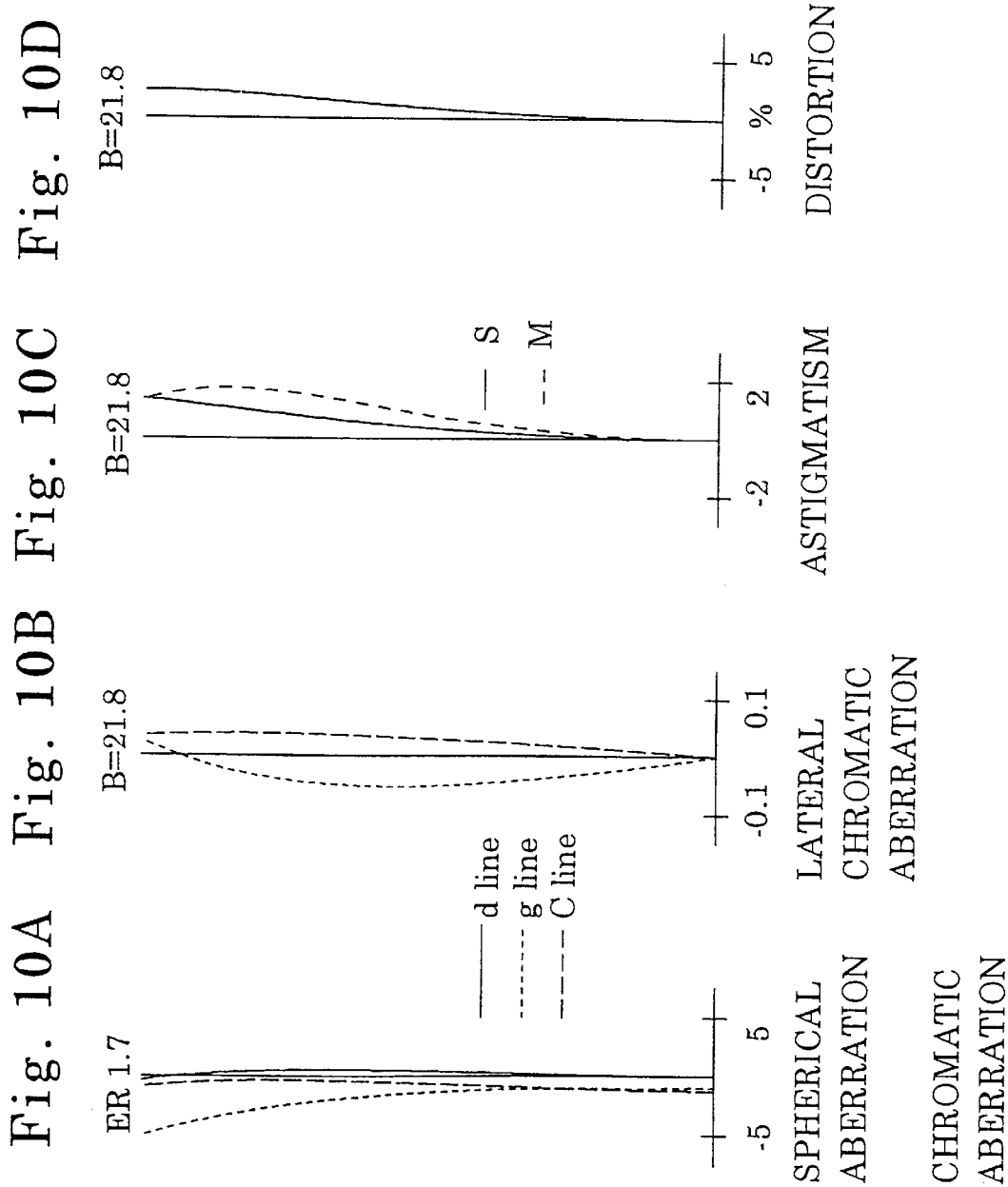
FIGS. 10A, 10B, 10C and 10D are aberration diagrams of the lens arrangement shown in FIG. 9.
Figure 11:
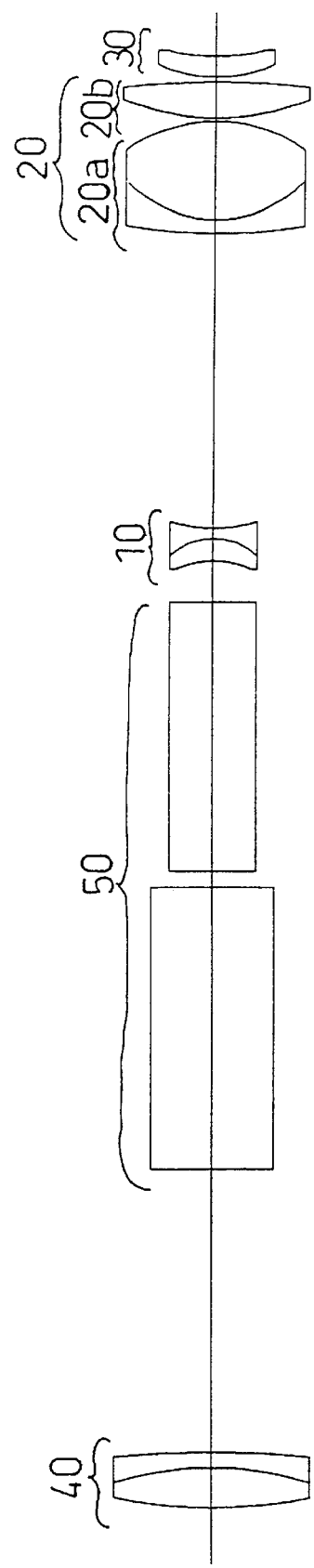
FIG. 11 is the lens arrangement of the second embodiment at the maximum magnification.
Figure 12:
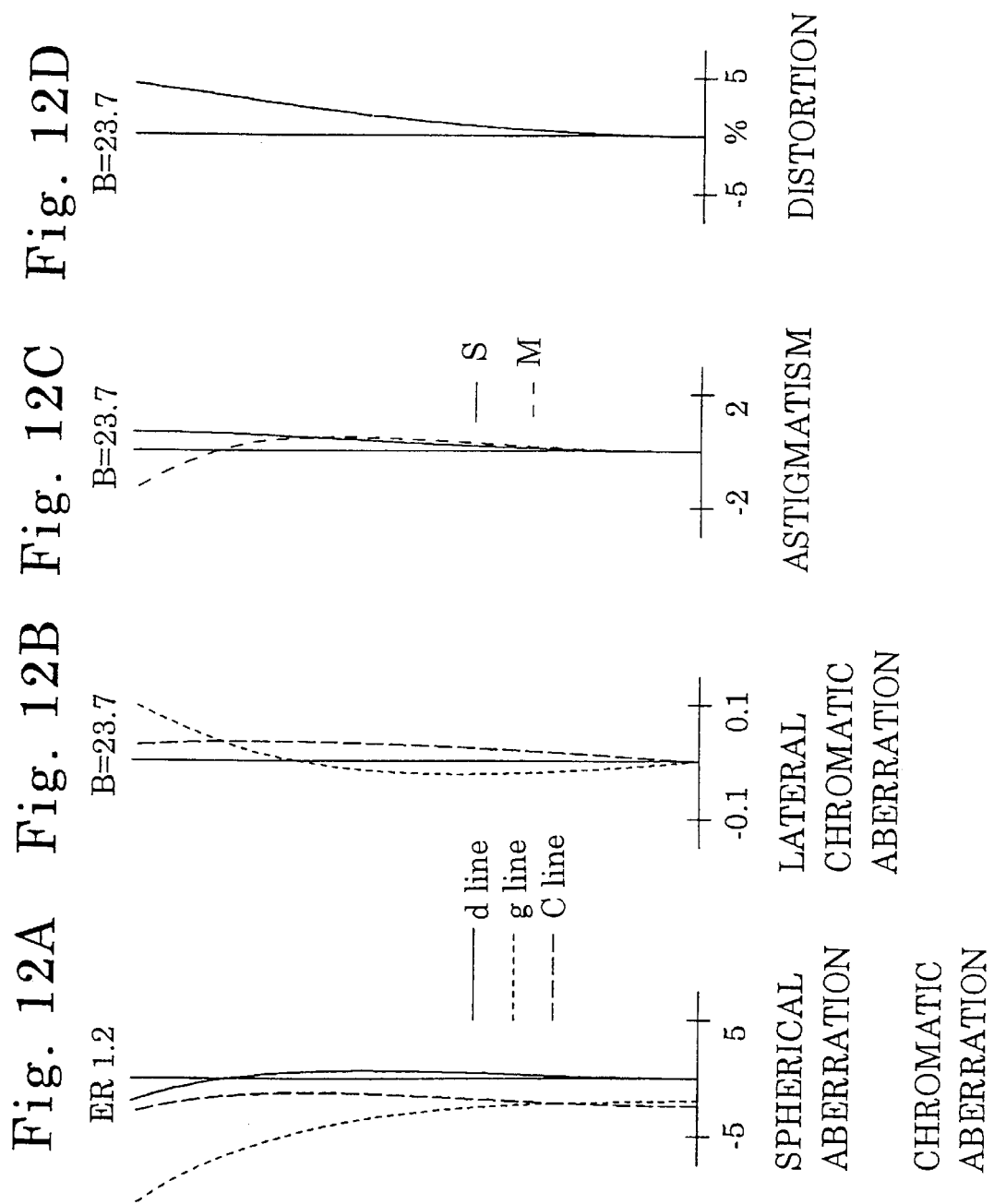
FIGS. 12A, 12B, 12C and 12D are aberration diagrams of the lens arrangement shown in FIG. 11.

FIGS. 7, 9 and 11 show the lens arrangements of the variable-power eyepiece optical system respectively at the minimum magnification, at a medium magnification and at the maximum magnification. FIGS. 8A through 8D, FIGS. 10A through 10D and FIGS. 12A through 12D are the aberration diagrams for the lens arrangements respectively shown in FIGS. 7, 9 and 11. Table 2 shows the lens data thereof. The basic lens arrangement and the movement of the lens groups upon variable power are the same as the first embodiment.

Table 2

W=2.7–1.6–1.2

$f_o$=98.391

$f_e$=12.242–7.025–5.027 (Variable-Power Ratio: 2.44)

| Surface No. | R | D | Nd | ν |
|---|---|---|---|---|
| 1 | 59.200 | 4.800 | 1.51633 | 64.1 |
| 2 | −43.195 | 1.800 | 1.62004 | 36.3 |
| 3 | −158.490 | 34.256 | — | — |
| 4 | ∞ | 34.000 | 1.56883 | 56.3 |
| 5 | ∞ | 2.000 | — | — |
| 6 | ∞ | 33.000 | 1.56883 | 56.3 |
| 7 | ∞ | 10.390–6.259–5.030 | — | — |
| 8 | −11.336 | 2.800 | 1.84666 | 23.8 |
| 9 | −7.600 | 1.300 | 1.51633 | 64.1 |
| 10 | 17.179 | 11.130–24.933–35.742 | — | — |
| 11 | 65.000 | 1.600 | 1.84666 | 23.8 |
| 12 | 15.563 | 11.330 | 1.60311 | 60.7 |
| 13 | −19.431 | 0.400–5.236–0.400 | — | — |
| 14 | 31.990 | 4.200 | 1.69680 | 55.5 |
| 15 | −104.800 | 19.880–5.373–0.628 | — | — |
| 16 | 17.416 | 2.500 | 1.51633 | 64.1 |
| 17 | 27.773 | — | — | — |

Embodiment 3

Figure 13:
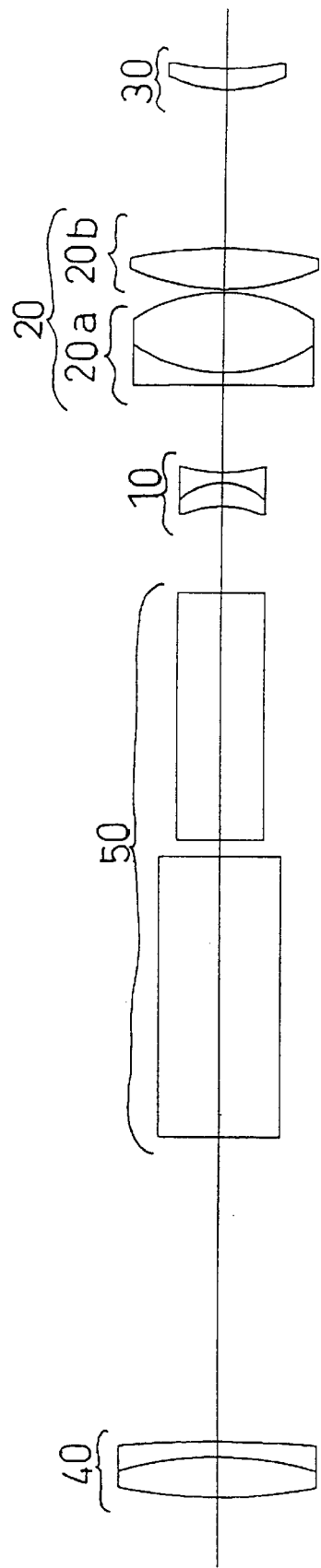
FIG. 13 is a lens arrangement of a third embodiment of a variable-power eyepiece optical system, according to the present invention, at the minimum magnification; and in the lens arrangement of FIG. 13, an objective optical system and an erecting optical system are also shown.
Figure 14:
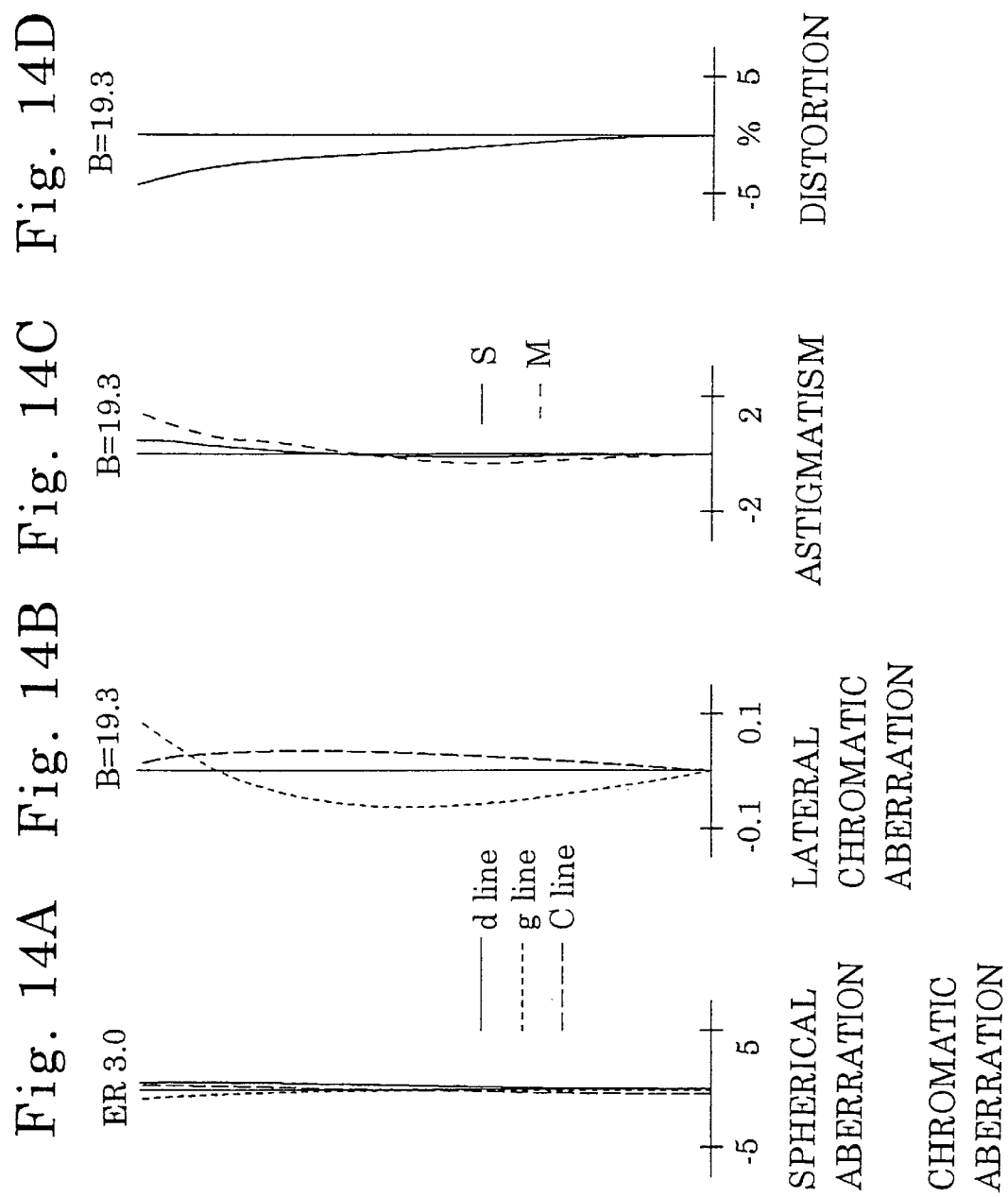
FIGS. 14A, 14B, 14C and 14D are aberration diagrams of the lens arrangement shown in FIG. 13.
Figure 15:
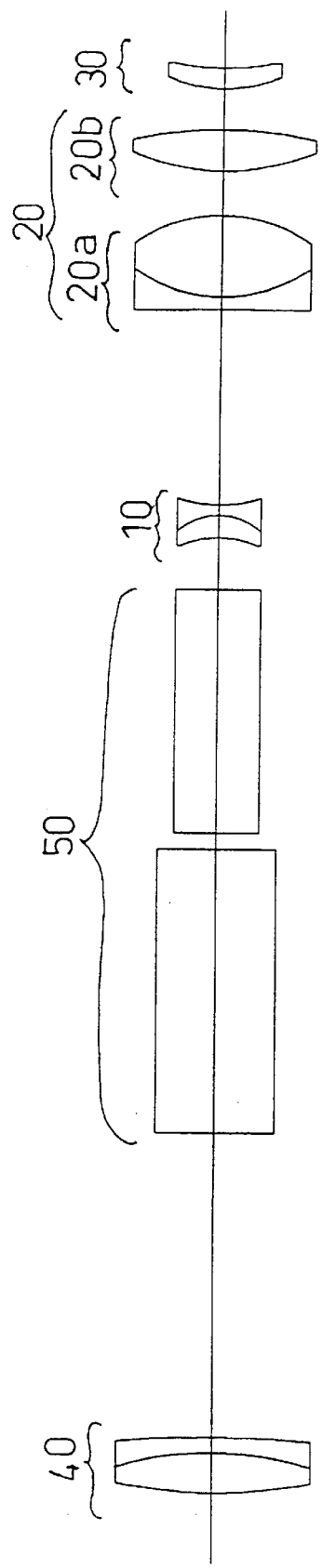
FIG. 15 is the lens arrangement of the third embodiment at a medium magnification.
Figure 16:
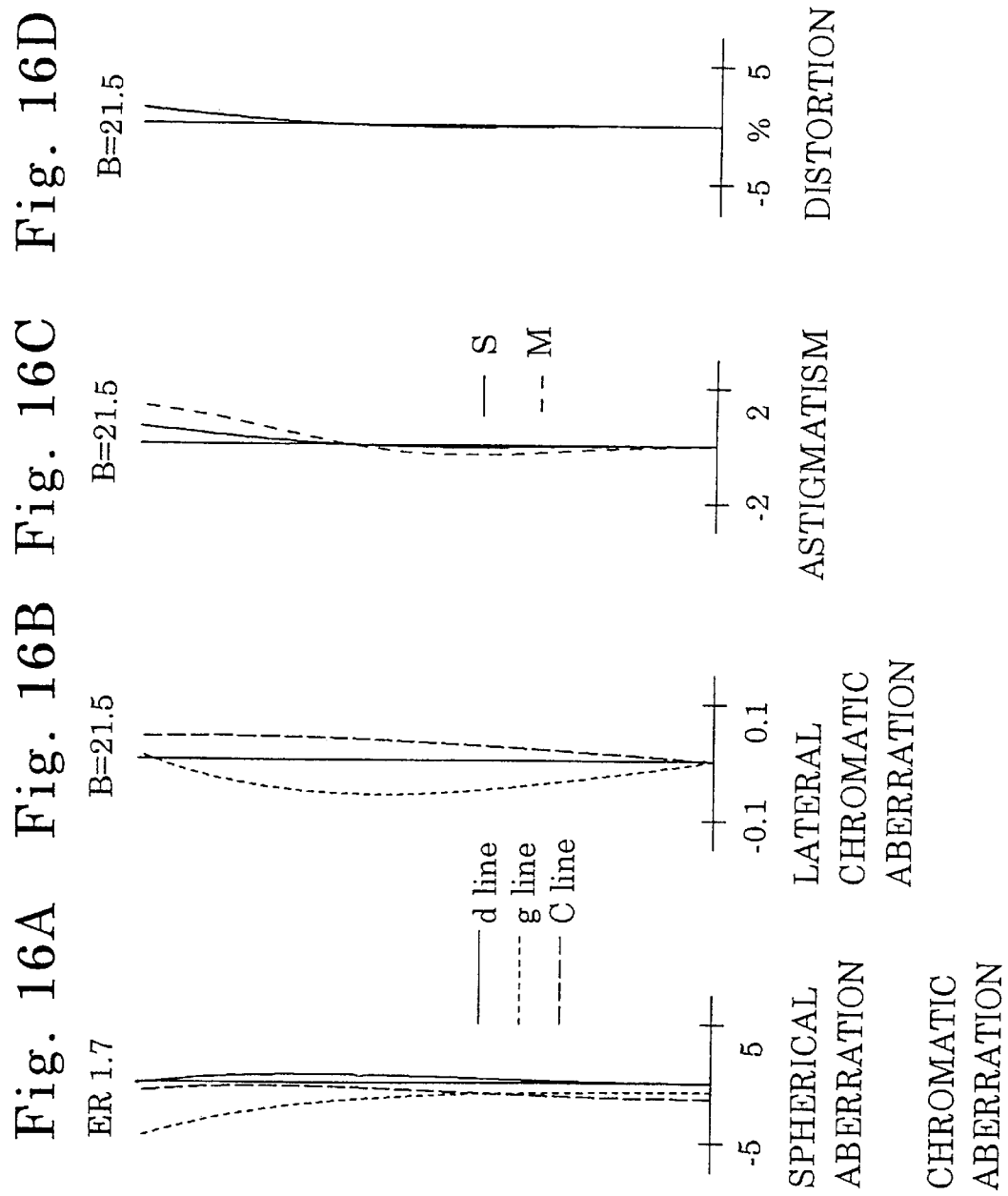
FIGS. 16A, 16B, 16C and 16D are aberration diagrams of the lens arrangement shown in FIG. 15.
Figure 17:
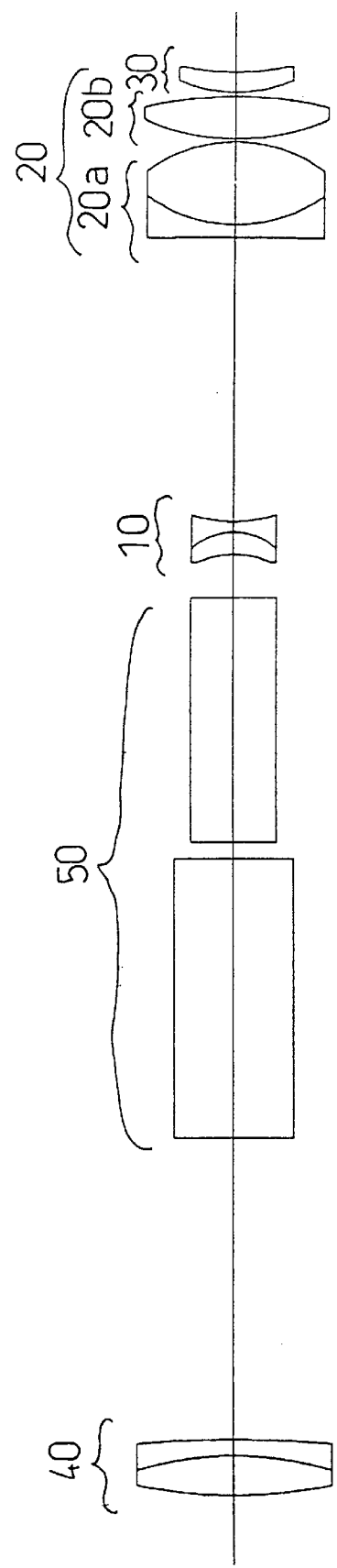
FIG. 17 is the lens arrangement of the third embodiment at the maximum magnification.
Figure 18:
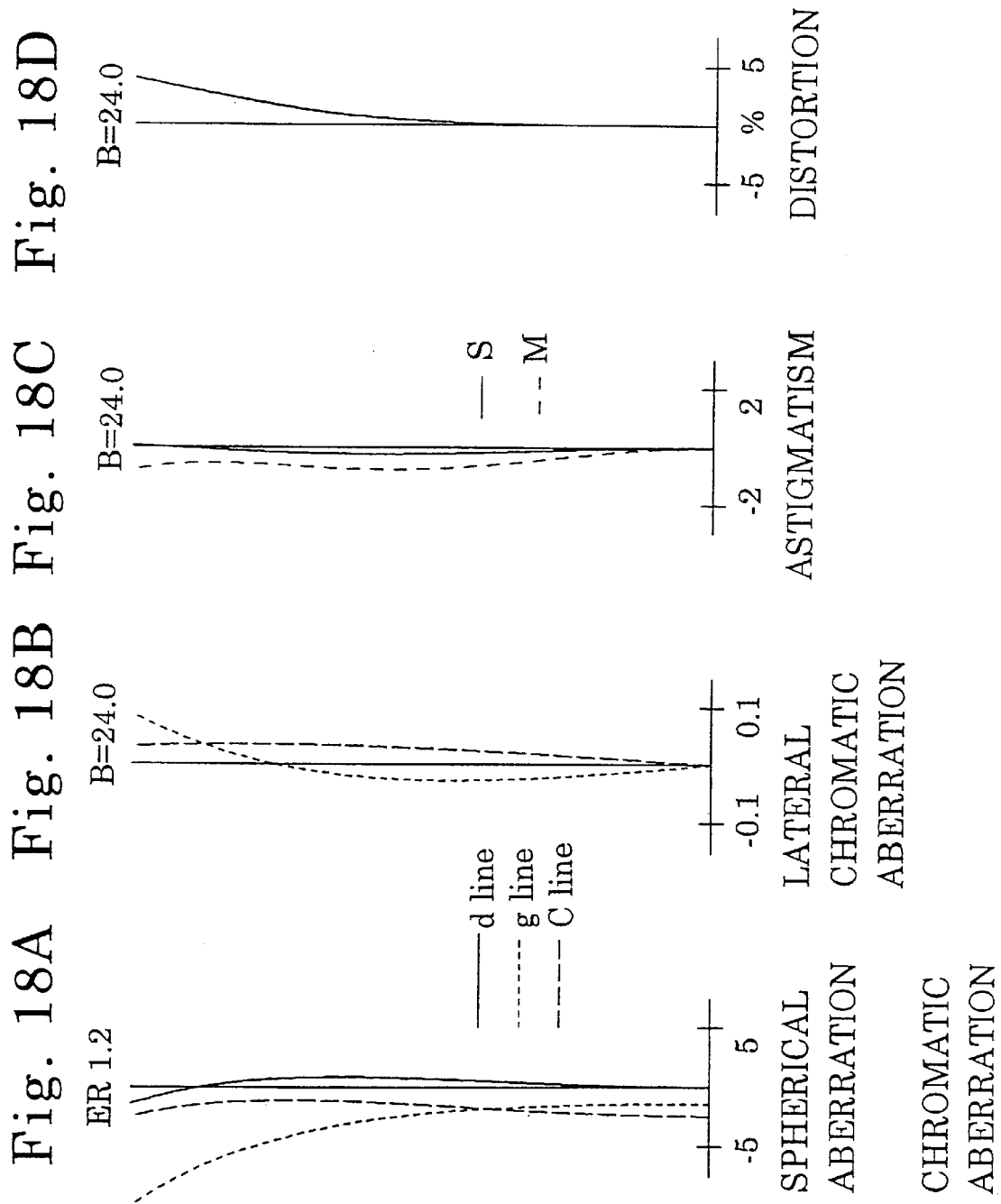
FIGS. 18A, 18B, 18C and 18D are aberration diagrams of the lens arrangement shown in FIG. 17.

FIGS. 13, 15 and 17 show the lens arrangements of the variable-power eyepiece optical system respectively at the minimum magnification, at a medium magnification and at the maximum magnification. FIGS. 14A through 14D, FIGS. 16A through 16D and FIGS. 18A through 18D are the aberration diagrams for the lens arrangements respectively shown in FIGS. 13, 15 and 17. Table 3 shows the lens data thereof. The basic lens arrangement and the movement of the lens groups upon variable power are the same as the first embodiment.

Table 3

W=2.7–1.6–1.3
$f_o$=98.391
$f_e$=12.253–7.026–5.025 (Variable-Power Ratio: 2.44)

| Surface No. | R | D | Nd | ν |
|---|---|---|---|---|
| 1 | 59.200 | 4.800 | 1.51633 | 64.1 |
| 2 | −43.195 | 1.800 | 1.62004 | 36.3 |
| 3 | −158.490 | 36.168 | — | — |
| 4 | ∞ | 34.000 | 1.56883 | 56.3 |
| 5 | ∞ | 2.000 | — | — |
| 6 | ∞ | 30.000 | 1.56883 | 56.3 |
| 7 | ∞ | 10.580–6.468–5.219 | — | — |
| 8 | −11.336 | 2.800 | 1.84666 | 23.8 |
| 9 | −7.600 | 1.300 | 1.51633 | 64.1 |
| 10 | 17.179 | 10.700–23.830–34.311 | — | — |
| 11 | −607.086 | 1.600 | 1.84666 | 23.8 |
| 12 | 19.310 | 9.720 | 1.69680 | 55.5 |
| 13 | −19.310 | 0.400–5.360–0.400 | — | — |
| 14* | 26.266 | 4.900 | 1.49176 | 57.4 |
| 15 | −50.887 | 18.820–4.842–0.571 | — | — |
| 16 | 17.494 | 2.500 | 1.51633 | 64.1 |
| 17 | 31.300 | — | — | — |

*designates the aspherical surface which is symmetrical with respect to the optical axis.

Aspherical surface data (aspherical surface coefficients not indicated are zero (0.00)):

| Surface No. | 14 |
|---|---|
| K | 0.00 |
| A4 | −0.3000 × 10$^{-4}$ |
| A6 | 0.3000 × 10$^{-6}$ |
| A8 | −0.1800 × 10$^{-8}$ |
| A10 | 0.1800 × 10$^{-11}$ |
| A12 | 0.1700 × 10$^{-13}$ |

Table 4 shows the eye relief values for the minimum magnification, a medium magnification, and the maximum magnification.

TABLE 4

| | Minimum Magnification | Medium Magnification | Maximum Magnification |
|---|---|---|---|
| Embodiment 1 | 13.7 | 14.1 | 14.8 |
| Embodiment 2 | 14.2 | 15.2 | 15.4 |
| Embodiment 3 | 14.9 | 15.1 | 15.1 |

Table 5 shows the numerical values of condition (1) for each embodiment.

| | Condition (1) |
|---|---|
| Embodiment 1 | 0.915 |
| Embodiment 2 | 0.975 |
| Embodiment 3 | 0.963 |

Each embodiment satisfies condition (1), and aberrations are adequately corrected. Furthermore, the change in the eye relief at each focal length is extremely small.

According to the present invention, a variable-power eyepiece optical system, in which the positional change in the eye relief is very small upon variable power, can be obtained.

What is claimed is:

1. A variable-power eyepiece optical system, which is used in combination with an objective optical system, comprising a negative first lens group, a second lens group having a positive first sub lens group and a positive second sub lens group, and a positive third lens group, in this order from said objective optical system;

wherein said first lens group, and said first and second sub lens groups are made moveable along the optical axis upon varying power, and said third lens group is made immoveable; and wherein upon varying power, said first sub lens group and said second sub lens group move independently of each other in a direction opposite to the direction along which said first lens group moves, so that the resultant power of said first and second sub lens groups is varied.

2. The variable-power eyepiece optical system according to claim 1, wherein said variable-power eyepiece optical system satisfies the following condition:

$$0.7 < f2a/f2b < 1.4$$

wherein f2a designates the focal length of said positive first sub lens group; and f2b designates the focal length of said positive second sub lens group.

3. The variable-power eyepiece optical system according to claim 1, wherein said first sub lens group comprises a cemented sub lens group having a negative lens element and a positive lens element; and wherein said second sub lens group comprises a single lens element.

* * * * *